US011126996B2

(12) United States Patent
Koike et al.

(10) Patent No.: US 11,126,996 B2
(45) Date of Patent: *Sep. 21, 2021

(54) SETTLEMENT SYSTEM, SERVER DEVICE, TERMINAL DEVICE, METHOD AND PROGRAM

(71) Applicant: NEC Corporation, Tokyo (JP)

(72) Inventors: Yuichi Koike, Tokyo (JP); Saburo Shiota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

This patent is subject to a terminal disclaimer.

(21) Appl. No.: 16/023,707

(22) Filed: Jun. 29, 2018

(65) Prior Publication Data

US 2018/0308089 A1  Oct. 25, 2018

Related U.S. Application Data

(63) Continuation of application No. 14/379,284, filed as application No. PCT/JP2013/004266 on Jul. 10, 2013, now Pat. No. 10,032,158.

(51) Int. Cl.
*G06Q 40/00* (2012.01)
*G06Q 20/34* (2012.01)
(Continued)

(52) U.S. Cl.
CPC ......... *G06Q 20/3433* (2013.01); *G06Q 20/06* (2013.01); *G06Q 20/1085* (2013.01);
(Continued)

(58) Field of Classification Search
CPC ...... G06Q 20/40; G06Q 20/10; G06Q 20/341; G06Q 20/20; G06Q 20/322
See application file for complete search history.

(56) References Cited

U.S. PATENT DOCUMENTS

2002/0194590 A1* 12/2002 Pong ..................... H04N 7/16
725/32
2003/0222138 A1* 12/2003 Oppenlander ....... G06Q 20/403
235/380
(Continued)

FOREIGN PATENT DOCUMENTS

CN  1185851 A  6/1998
CN  101107621 A  1/2008
(Continued)

OTHER PUBLICATIONS

Frequently Asked Questions Regarding the EZ-Pass from the Maine Turnpike. Dec. 5, 2004. http://web.archive.org/web/20041205031653/www.ezpassmaineturnpike.com/info/faqs.htm (Year: 2004).*
(Continued)

*Primary Examiner* — Mike Anderson

(57) ABSTRACT

A terminal device includes selection means for comparing a payment amount with a set amount read from a recording medium and for selecting between off-line processing and on-line processing, depending on a result of the comparison, off-line processing means for subtracting the payment amount from the set amount recorded in the recording medium and sending the payment amount to a server device; and on-line processing means for sending the payment amount to the server device and updating the set amount when having received an update value. A server device includes server processing means for receiving the payment amount from a terminal device and subtracting the payment amount from a balance of an account corresponding to the recording medium, and in a case of the on-line processing, sending the update value to the terminal device.

8 Claims, 9 Drawing Sheets

(51) Int. Cl.
  *G06Q 20/06* (2012.01)
  *G07F 7/12* (2006.01)
  *G07F 19/00* (2006.01)
  *G06Q 20/10* (2012.01)

(52) U.S. Cl.
  CPC .......... *G06Q 20/341* (2013.01); *G07F 7/127* (2013.01); *G07F 19/20* (2013.01)

(56) References Cited

U.S. PATENT DOCUMENTS

| | | | | |
|---|---|---|---|---|
| 2004/0006536 | A1* | 1/2004 | Kawashima | G06Q 20/04 705/39 |
| 2004/0230535 | A1* | 11/2004 | Binder | G06Q 20/24 705/64 |
| 2007/0168260 | A1* | 7/2007 | Cunescu | G06Q 30/06 705/26.1 |
| 2008/0319875 | A1* | 12/2008 | Levchin | G06Q 20/405 705/44 |

FOREIGN PATENT DOCUMENTS

| | | |
|---|---|---|
| CN | 102081821 A | 6/2011 |
| JP | S61-32177 | 2/1986 |
| JP | 2001-143007 | 5/2001 |
| JP | 2001-167217 | 6/2001 |
| JP | 2005-301945 | 10/2005 |

OTHER PUBLICATIONS

Office Action dated Apr. 26, 2016, by the Chinese Patent Office in counterpart Chinese Patent Application No. 2013800094727.
Partial English-language translation of International Preliminary Report on Patentability in PCT/JP2013/004266.
Frequently Asked Questions Regarding the EZ-Pass from the Maine Turnpike. Dec. 5, 2004. http://web.archive.org/web/20041205031653/www.ezpassmaineturnpike.com/info/faqs.htm.

* cited by examiner

Fig.2

| ACCOUNT ID / 51 | BALANCE / 52 | PAYMENT AMOUNT AVERAGE / 53 |
|---|---|---|
|  |  |  |
|  |  |  |
|  |  |  |

SETTLEMENT SYSTEM, SERVER DEVICE, TERMINAL DEVICE, METHOD AND PROGRAM

CROSS-REFERENCE TO RELATED PATENT APPLICATIONS

This application is a continuation of U.S. application Ser. No. 14/379,284, filed Aug. 15, 2014, which is a National Stage Entry of International Application No. PCT/JP2013/004266, filed Jul. 10, 2013. The entire contents of the above-referenced applications are expressly incorporated herein by reference.

TECHNICAL FIELD

The present invention relates to a settlement system, a server device, a terminal device, a method and a program, in particular to those which perform on-line settlement and off-line settlement by switching between them.

BACKGROUND

Patent Literature 1 discloses an authentication processing device which switches between off-line authentication and on-line authentication, in credit-card settlement, by comparing a settlement money amount with a reference settlement money amount.

Patent Literature 2 discloses an electronic settlement system which separates a balance of a bank account into that for on-line settlement and that for off-line settlement, and then stores the balance for on-line settlement into the normal area of an account file of the bank, and the balance for off-line settlement into an IC (Integrated Circuit) card. This system guarantees a money amount that can be used off-line. The money amount is set and updated by the customer himself/herself by the use of a terminal device.

CITATION LIST

Patent Literature

[Patent Literature 1] Japanese Patent Application Laid-Open No. 2005-301945
[Patent Literature 2] Japanese Patent Application Laid-Open Number 61-32177

SUMMARY OF INVENTION

Technical Problem

In the device of Patent Literature 1, the reference settlement money amount is set to be the same value for every payer, and it accordingly is impossible to make determination reflecting a risk for individual payer. As a result, there may arises a case where off-line authentication is given to a payer who is given a low credit rating and a seller resultantly bears risk involved in collecting an excessive amount of payment.

As the technology of Patent Literature 2 separates the balance of a bank account into that for on-line settlement and that for off-line settlement, there arises a customer's inconvenience of not being able to use the whole amount of the balance of the customer's bank account even in on-line settlement. Because of possible occurrence of such inconvenience, the separation of a balance needs to be performed by the customer, and if it is impossible to ask the customer to perform such operation, the technology cannot be used. This technology cannot be used, for example, in a system such as of performing a settlement with a predetermined condition off-line on the basis of determination by the system side, for the purpose of speeding up the processing.

The objective of the present invention is to provide a technology for solving the above-described problem.

Solution to Problem

A settlement system according to one exemplary embodiment of the present invention comprises: a terminal device including selection means for comparing a payment amount with a set amount read from a recording medium and for selecting between off-line processing and on-line processing, depending on a result of the comparison; off-line processing means for performing a process of subtracting the payment amount from the set amount recorded in the recording medium and a process of sending the payment amount to a server device; and on-line processing means for performing a process of sending the payment amount to the server device and a process of updating the set amount when having received an update value;

and a server device comprising server processing means for performing a process of receiving the payment amount from the terminal device and a process of subtracting the payment amount from a balance of an account corresponding to the recording medium, and for performing, in a case of the on-line processing, a process of sending the update value to the terminal device.

A server device according to one exemplary embodiment of the present invention connected to a terminal device: the terminal device performing: a process of comparing a payment amount with a set amount read from a recording medium; and, depending on a result of the comparison, off-line processing including a process of subtracting the payment amount from the set amount recorded in the recording medium and a process of sending the payment amount to the server device, or on-line processing comprising a process of sending the payment amount to the server device and a process of updating the set amount when having received an update value;

and the server device comprises server processing means for performing a process of receiving the payment amount from the terminal device and a process of subtracting the payment amount from the balance of an account corresponding to the recording medium, and in a case of the on-line processing, performing a process of sending the update value to the terminal device A terminal device according to one exemplary embodiment of the present invention comprises: selection means for comparing a payment in amount with a set amount read from a recording medium and for selecting between off-line processing and on-line processing, depending on a result of the comparison;

off-line processing means for performing a process of subtracting the payment amount from the set amount recorded in the recording medium and a process of sending the payment amount to a server device; and on-line processing means for performing a process of sending the payment amount to the server device and a process of updating the set amount when having received an update value, wherein the terminal device connected to a server device which performs a process of receiving the payment amount and a process of subtracting the payment amount from a balance of an account corresponding to the recording medium, and in a case of the on-line processing, performs a process of sending the update value.

A method according to one exemplary embodiment of the present invention comprises: performing a process of comparing a payment amount with a set amount read from a recording medium; performing, depending on a result of the comparison, an off-line processing including a process of subtracting the payment amount from the set amount recorded in the recording medium and a process of sending the payment amount, or an on-line processing including a process of sending the payment amount and a process of updating the set amount when having received an update value; and performing a process of receiving the payment amount, a process of subtracting the payment amount from a balance of an account corresponding to the recording medium and, in a case of the on-line processing, a process of sending the update value, A method according to one exemplary embodiment of the present invention comprising: connecting to a terminal device which performs: a process of comparing a payment amount with a set amount read from a recording medium; and, depending on a result of the comparison, an off-line processing including a process of subtracting the payment amount is from the set amount recorded in the recording medium and a process of sending the payment amount to a server device, or an on-line processing including a process of sending the payment amount to the server device and a process of updating the set amount when having received an update value; and performing a process of receiving the payment amount from the terminal device, a process of subtracting the payment amount from the balance of an account corresponding to the recording medium and, in a case of the on-line processing, a process of sending the update value to the terminal device.

A method according to one exemplary embodiment of the present invention comprises connecting to a server device which performs a process of receiving a payment amount, a process of subtracting the payment amount from a balance of an account corresponding to a recording medium and, in a case of the on-line processing, a process of sending an update value performing a process of comparing the payment amount with a set amount read from the recording medium; and performing, depending on a result of the comparison, off-line processing including a process of subtracting the payment amount from the set amount recorded in the recording medium and a process of sending the payment amount to a server device, or on-line processing including a process of sending the payment amount to the server device and a process of updating the set amount when having received an update value.

A program according to one exemplary embodiment of the present invention which causes a computer connected to a terminal device, the terminal device performing a process of comparing a payment amount with a set amount read from a recording medium; and, depending on a result of the comparison, an off-line processing including a process of subtracting the payment amount from the set amount recorded in the recording medium and a process of sending the payment amount to a server device or an on-line processing including a process of sending the payment amount to the server device and a process of updating the set amount when having received an update value, to perform a process of receiving the payment amount from the terminal device, a process of subtracting the payment amount from the balance of an account corresponding to the recording medium and, in a case of the on-line processing, a process of sending the update value to the terminal device.

A program according to one exemplary embodiment of the present invention which causes a computer connected to a server device, the server device performing a process of receiving a payment amount, a process of subtracting the payment amount from a balance of an account corresponding to a recording medium and, in a case of on-line processing, a process of sending an update value, to perform a selection process of comparing the payment amount with a set amount read from the recording medium and, depending on a result of the comparison, selecting between off-line processing and the on-line processing, the off-line processing including a process of subtracting the payment amount from the set amount recorded in the recording medium and a process of sending the payment amount to the server device; and the on-line processing including a process of sending the payment amount to the server device and a process of updating the set amount when having received the update value.

Advantageous Effects of Invention

The present invention enables a settlement system employing electronic money or the like to perform on-line settlement and off-line settlement by switching between them, while reducing risk to the business side and not causing a user making payment to be aware of the switching.

BRIEF DESCRIPTION OF DRAWINGS

FIG. 2 shows information stored in an account storage unit 22.

DESCRIPTION OF EMBODIMENTS

First Exemplary Embodiment

Figure 1:
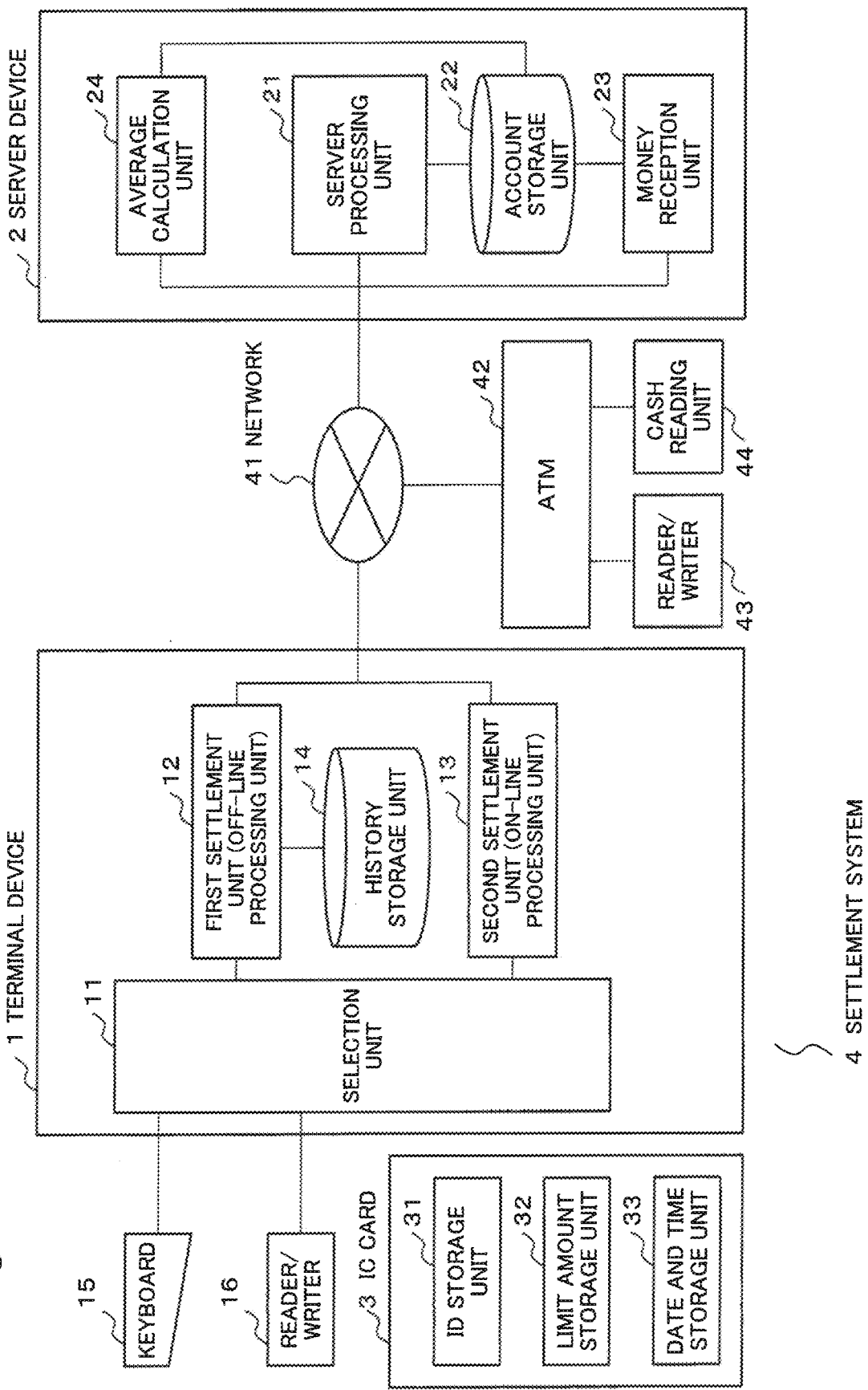
FIG. 1 is a configuration diagram of a settlement system 4 according to a first exemplary embodiment.

FIG. 1 is a configuration diagram of a settlement system 4 according to the present exemplary embodiment. The settlement system 4 includes a terminal device 1, an ATM (Automated teller machine) 42 and a server device 2, which are connected with each other via a network 41. There usually exist a plurality of terminal devices 1 and ATMs 42.

The terminal device 1 is installed, for example, at a payment counter in a store. The ATM 42 and the server device 2 are installed, for example, in a bank. The settlement system 4 performs either of off-line settlement and on-line settlement, depending on the amount of payment by a user.

In off-line settlement, the user makes payment with electronic money or the like stored in an IC card 3 the user carries. In the off-line settlement, the user does not need to wait for completion of communication between the terminal device 1 and the server device 2. In on-line settlement, the user makes payment out of the user's bank account stored in the server device 2. In the on-line settlement, the user needs to wait for completion of communication between the terminal device 1 or the server device 2.

The terminal device 1 is equipped a selection unit 11, a first settlement unit 12 (may be referred to also as an off-line processing unit 12), a second settlement unit 13 (may be referred to also as an on-line processing unit 13) and a history storage unit 14. A keyboard 15 and a reader/writer 16 are connected to the selection unit 11.

The selection unit 11 determines which between the off-line settlement and the on-line settlement is to be performed, depending on a payment amount inputted from the keyboard 15 or the like. The first settlement unit 12 performs off-line processing which is processing on the side of the terminal device 1 relevant to the off-line settlement, and the second settlement unit 13 performs on-line processing which is processing on the side of the terminal device 1 relevant to the on-line settlement. The history storage unit 14 stores a history of payment amounts of the off-line settlement. The history is, for example, one in which payment amounts subjected to the off-line settlement are recorded in a temporally sequential manner with respect to each user. For example, the first settlement unit 12 periodically sends the history to the server device 2.

The reader/writer 16 reads and writes data stored in the IC card 3. The IC card 3 is equipped an ID storage unit 31 which stores a card ID (IDentification) or a user ID (henceforth, simply referred to as an ID), a limit amount storage unit 32 which stores a limit amount for the off-line settlement (may be referred to also as a set amount) and a date and time storage unit 33 which stores the date and time of a last performed on-line settlement (henceforth, referred to as the last date and time).

Here, the selection unit 11, the first settlement unit 12 and the second settlement unit 13 are constructed using logic circuits or the like. They may also be implemented by software which is stored in a memory (not illustrated) of the terminal device 1 and executed by a processor (not illustrated) of the terminal device 1. The history storage unit 14 is a storage device such as an IC memory and a disk device.

The server device 2 is equipped a server processing unit 21, an account storage unit 22, a money reception unit 23 and an average calculation unit 24. The server processing unit 21 performs the off-line settlement and the on-line settlement in collaboration with the first settlement unit 12 and the second settlement unit 13, respectively, of the terminal device 1. The account storage unit 22 stores information on such as users' bank accounts. The money reception unit 23 adds the amount of cash put into the ATM 42 to a balance 52 of the user's bank account. The average calculation unit 24 calculates an average of payment amounts, with respect to each user, from the history of payment amounts periodically sent from the terminal device 1.

Here, the server processing unit 21, the money reception unit 23 and the average calculation unit 24 are constructed using logic circuits or the like. They may also be implemented by software which is stored in a memory (not illustrated) of the terminal device 1 and executed by a processor (not illustrated) of the terminal device 1. The account storage unit 22 is a storage device such as an IC memory and a disk device.

The ATM 42 is connected to the reader/writer 43 and to a cash reading unit 44. The reader/writer 43 reads and writes data stored in the IC card 3. The cash reading unit 44 reads the money amount of currency put into the ATM 42.

FIG. 2 shows information stored in the account storage unit 22. The account storage unit 22 stores an account ID 51, the balance 52 and a payment average 53, with respect to each of users' bank accounts. The account ID 51 is of the same value as that of the ID stored in the ID storage unit 31 of the IC card 3 issued to a user of the corresponding account. The payment average 53 is an average value of payment amounts of the user of the account.

Figure 3:
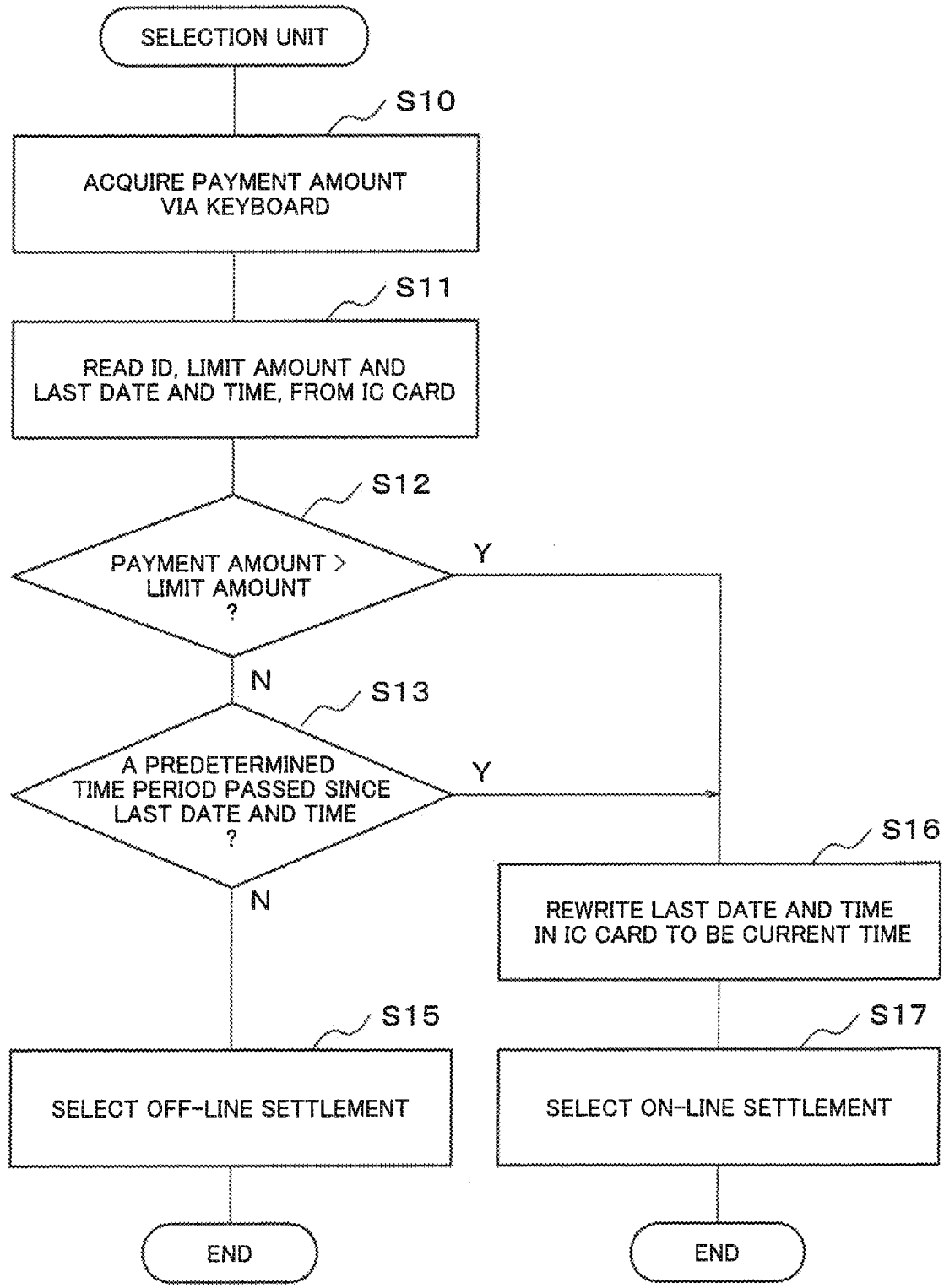
FIG. 3 is a flow chart of operation of a selection unit 11.

FIG. 3 is a flow chart of operation of the selection unit 11. The selection unit 11 starts the operation when, for example, a person operating terminal device 1 has inputted a payment amount to the keyboard 15. The selection unit 11 may start the operation in response to detection of the IC card 3 by the reader/writer 16.

The selection unit 11 reads the payment amount from the keyboard 15 (S10), and also reads an ID, a limit amount and a last date and time from the IC card 3 (S11). The selection unit 11 reads the ID, the limit amount and the last date and time from, respectively, the ID storage unit 31, the limit amount storage unit 32 and the date and time storage unit 33.

If the payment amount is larger than the limit amount (Y at S12) or a predetermined time period has passed since the last date and time (Y at S13), the selection unit 11 stores the current time into the date and time storage unit 33 of the IC card 3 (S16) and subsequently selects the on-line settlement (S17). For example, the selection unit 11 causes the second settlement unit 13 to start up. Here, the predetermined time period is given in advance to the selection unit 11 by an administrator or the like of the terminal device 1.

In another case (N at both S12 and S13), the selection unit 11 selects the off-line settlement (S15). For example, the selection unit 11 causes the first settlement unit 12 to start up.

Figure 4:
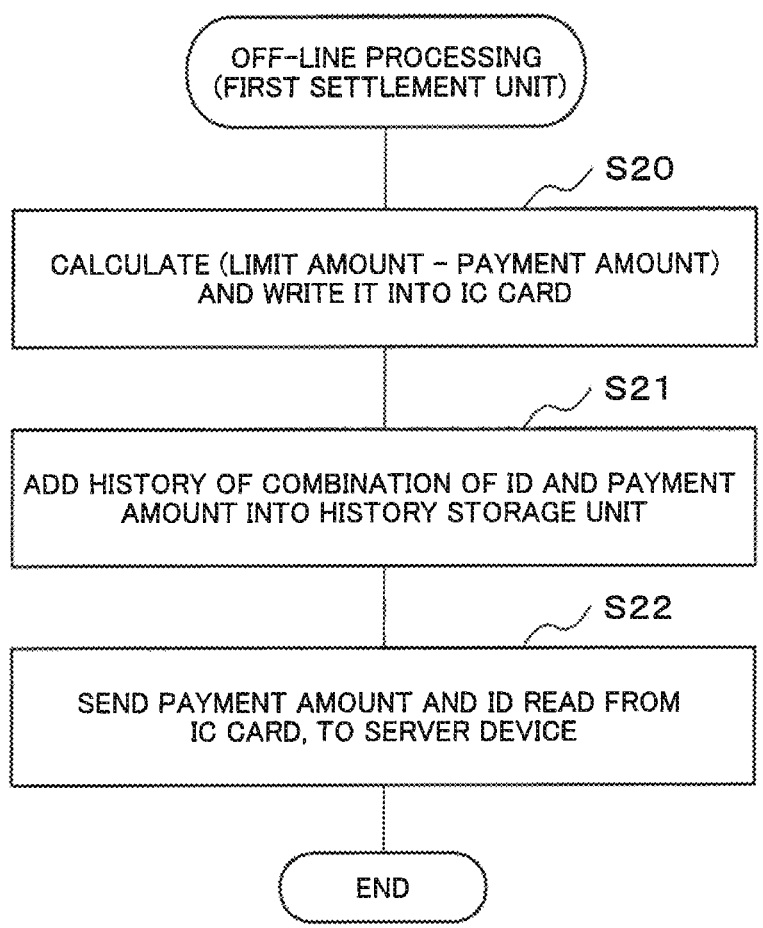
FIG. 4 is a flow chart of operation of a first settlement unit 12.

FIG. 4 is a flow chart of operation of the first settlement unit 12. This is a process flow of the off-line processing.

The first settlement unit 12 calculates a value obtained by subtracting the payment amount from the limit amount and stores the calculated value into the limit amount storage unit 32 of the IC card 3 (S20). At this moment, determining that the payment operation has been completed for the user, the first settlement unit 12 may permit the user to leave taking the IC card 3.

After that, the first settlement unit 12 adds the ID and the payment amount into the history storage unit 14 (S21) and sends the payment amount and the ID to the server device 2 (S22). The first settlement unit 12 does not necessarily need to wait for a response from the server device 2.

Figure 5:
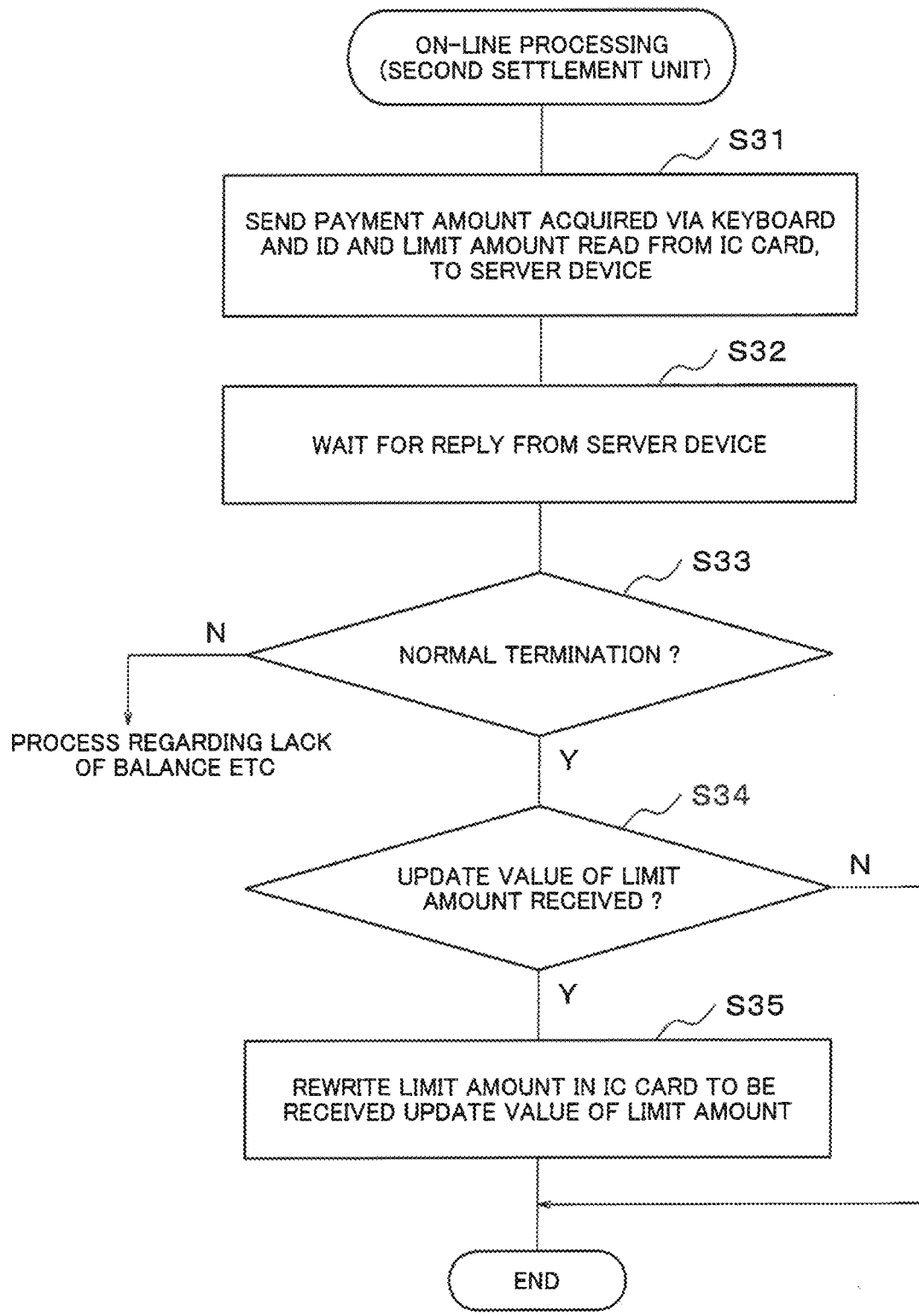
FIG. 5 is a flow chart of operation of a second settlement unit 13.

FIG. 5 is a flow chart of operation of the second settlement unit 13. This is a process flow of the on-line processing.

First, the second settlement unit 13 sends, to the server device 2, the payment amount inputted from the keyboard 15 and the ID and the limit amount read from the IC card 3 (S31), and then waits for a reply from the server device 2 (S32). When a reply is received from the server device 2 and if the reply shows normal termination of the process (Y at S33) and also includes an update value of limit amount (may be referred to also simply as an update value) (Y at S34), the second settlement unit 13 stores thus received update value of limit amount into the limit amount storage unit 32 of the IC card 3 (S35). If no update value of limit amount is included (N at S34), the second settlement unit 13 performs no update on the limit amount storage unit 32 of the IC card 3.

If receiving from the server device 2 a reply showing abnormal termination of the process (N at S33), the second settlement unit 13 performs a process for dealing with a cause of the abnormality. The cause of abnormality is, for example, lack of the balance 52 or the like.

Figure 6:
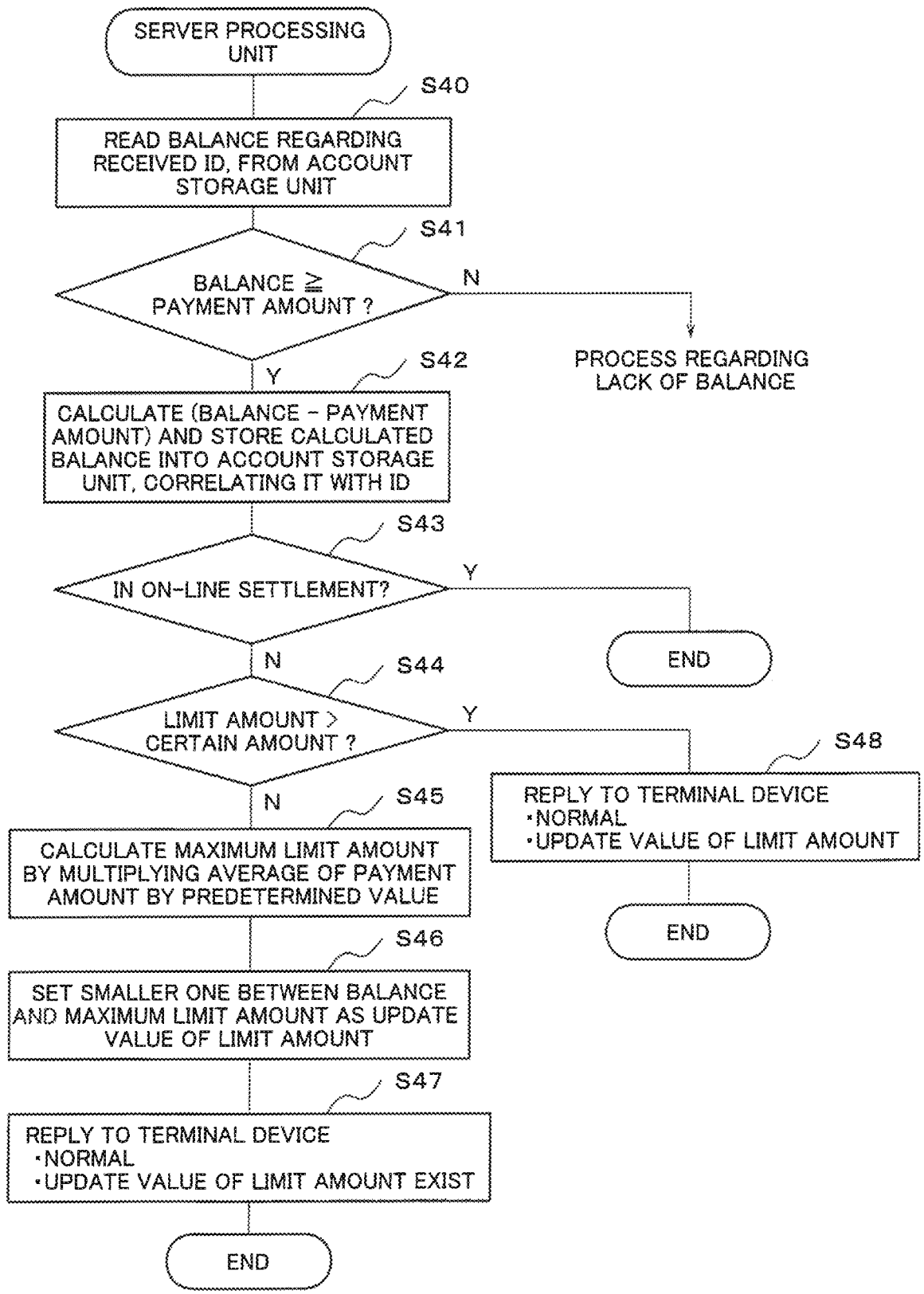
FIG. 6 is a flow chart of operation of a server processing unit 21.

FIG. 6 is a flow chart of operation of the server processing unit 21. The server processing unit 21 starts the process on receiving data on a payment amount, an ID and the like from the first settlement unit 12 or the second settlement unit 13, of the terminal device 1.

First, the server processing unit 21 reads the balance 52 with regard to the account ID 51 coincident with the received ID, from the account storage unit 22 (S40). If confirming that the balance 52 is equal to or larger than the payment amount (Y at S41), the server processing unit 21 subtracts the payment amount from the balance 52 (S42). That is, the server processing unit 21 calculates a value obtained by subtracting the payment amount from the balance 52 and stores the calculated value into the storage unit 22 as the balance 52 with regard to the account ID 51, which is coincident with the received ID.

If the process has been being performed in the off-line settlement (Y at S43), the server processing unit 21 ends the process. Here, it is assumed that the server processing unit 21 has received information on which between the off-line settlement and the on-line settlement is to be performed, for example, along with the payment amount or the like, from the first settlement unit 12 or the second settlement unit 13.

If the process has been being performed in the on-line settlement (N at S43), the server processing unit 21 compares the limit amount received from the second settlement unit 13 with an update threshold value (S44). If the limit amount is larger than the update threshold value (Y at S44), the server processing unit 21 creates reply data showing a normal report and including no update value of limit amount and sends it to the terminal device 1 (S48). Here, when the limit amount is larger than the balance 52 after subtracting the payment amount from it, the server processing unit 21 may create reply data including the balance 52 after the subtraction as an update value of limit amount and send it to the terminal device 1.

The update threshold value is, for example, the payment amount average 53 stored in the account storage unit 22. The server processing unit 21 reads from the account storage unit 22 the payment amount average 53 with regard to the account ID 51 coincident with the received ID and then uses it as the update threshold value. The update threshold value may also be a fixed value given in advance to the server processing unit 21.

If the limit amount is equal to or smaller than the update threshold value (N at S44), the server processing unit 21 calculates a maximum limit amount by multiplying the update threshold value by a predetermined value (S45).

Then, the server processing unit 21 compares the maximum limit amount with the balance 52 calculated in S42 and sets the smaller one as an update value of limit amount (S46), creates reply data showing a normal report and including the update value of limit amount, and sends it to the terminal device 1 (S47).

If the balance 52 is smaller than the payment amount (N at S41), the server processing unit 21 performs a process for dealing with the insufficient balance. This process may be a process of sending, to the terminal device 1, reply data showing an abnormal report expressing settlement impossibility, and may also be a process of loaning the deficit amount.

Figure 7:
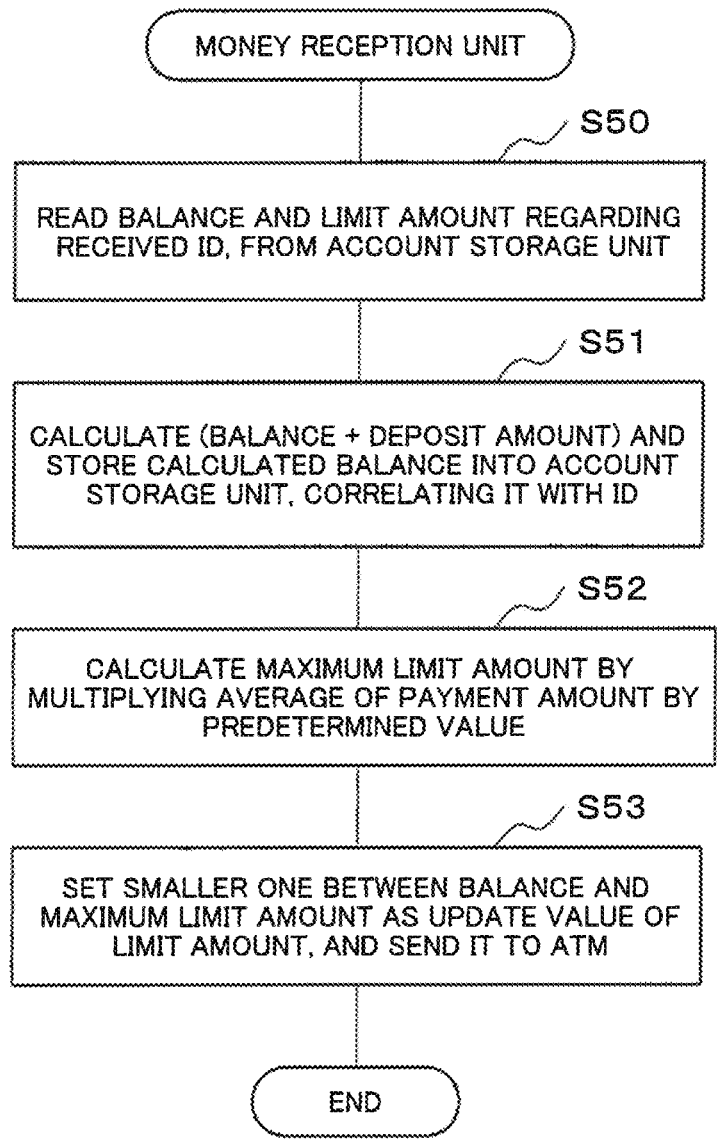
FIG. 7 is a flow chart of operation of a money reception unit 23.

FIG. 7 is a flow chart of operation of the money reception unit 23. The money reception unit 23 starts the process when a user has deposited currency to the bank or the like through the ATM 42.

Specifically, the money reception unit 23 is caused to start up as follows. First, for example, the user holds the IC card 3 over the reader/writer 43 and put currency into the cash reading unit 44. The reader/writer 43 reads an ID from the IC card 3. The cash reading unit 44 reads a deposit amount from the currency thus put into it. The ATM. 42 sends the ID and the deposit amount to the money reception unit 23 and causes it to start up.

The money reception unit 23 firstly reads the balance 52 with regard to the account ID 51 coincident with the received ID, from the account storage unit 22 (S50).

The money reception unit 23 adds the deposit amount to the balance 52 (S51). That is, the money reception unit 23 adds the deposit amount to the balance 52 and stores the resultant value into the account storage unit 22 as the balance 52 with regard to the account ID 51 coincident with the received ID.

The money reception unit 23 calculates a maximum limit amount by multiplying an update threshold value by a predetermined value (S52). The update threshold value is, for example, the payment amount average of 53 with regard to the account ID 51 coincident with the received ID. The money reception unit 23 compares the balance 52 calculated in S51 with the maximum limit amount calculated in S52, and sends the smaller one as an update value of limit amount to the ATM 42 (S53).

The ATM 42 having received the update value of limit amount stores it into the limit amount storage unit 32 of the IC card 3 by using the reader/writer 43.

Next, operation of the average calculation unit 24 will be described. The average calculation unit 24 is periodically caused to start up, for example, and merges histories of payment amounts sent from respective ones of the terminal devices 1. From the merged history, the average calculation unit 24 calculates, with respect to each ID, an average of payment amounts and stores it into the account storage unit 22 as the payment amount 53 with regard to the account ID 51 coincident with the ID.

The average calculation unit 24 may calculate either a simple average of the whole history or that of a recent history since a certain point of time. The average calculation unit 24 may also calculate a weighted average by giving a larger weight to a recent history.

The settlement system 4 according to the present exemplary embodiment can perform the on-line settlement and the off-line settlement by switching between them, while reducing risk to the business side and not causing a user making payment to be aware of the switching.

Specifically, for the purpose of speeding up the operation, for example, the settlement system 4 can set a reference of the switching between the on-line settlement and the off-line settlement without acquiring users' admission. Further, for the purpose of reducing risk of users' falling into settlement impossibility, for example, the settlement system 4 can set a different reference of the settlement switching for each user without acquiring users' admission.

It is because when a user attempts the on-line settlement, the user can use the whole of the balance of his/her bank account regardless of a limit amount for the off-line settlement stored in the IC card 3. Specifically, it is because a value stored as the balance 52 in the account storage unit 22 is that of the balance of the bank account from which the limit amount for the off-line settlement has not been subtracted. As a result, a user of the settlement system 4 does not need to be aware of the existence of a limit amount for the off-line settlement.

Further, the settlement system 4 according to the present exemplary embodiment can reduce a user's load of manipulating the IC card 3 in the on-line settlement, and can quickly complete settlement for the user even when it is performed on-line. It is because, in the on-line settlement, a limit amount for the off-line settlement stored in the IC card 3 is not updated if the limit amount remaining in the IC card 3 is sufficient (the route for N at S34 in FIG. 5).

If a limit amount stored in the IC card 3 is to be updated in the on-line settlement, the user may be requested twice to hold the IC card 3 over the reader/writer 16. The two requests are made at, respectively, a time of reading the limit amount (S11 in FIG. 3) and that of updating it (S35 in FIG. 5). Alternatively, the user may be requested to keep holding the IC card 3 over the reader/writer 16 during the whole time for the reading and update. In both of the cases, the user's load of manipulating the IC card 3 is increased. The settlement system 4 according to the present exemplary embodiment reduces this load by determining a case with no necessity of updating a limit amount stored in the IC card 3.

Further, the settlement system 4 according to the present exemplary embodiment can set an appropriate limit amount for the off-line settlement based on a user's purchasing habit. It is because the server processing unit 21 sets a value of predetermined times an average of the user's payment amounts as the limit amount. As a result, while it can be expected that a certain number of settlements are quickly performed by the off-line settlement on average, a money amount processed by the off-line settlement can be limited within the limit amount.

Further, the settlement system 4 according to the present exemplary embodiment prevents the off-line settlement from keeping being performed in a state of lack of the balance 52. It is because the selection unit 11 selects the on-line settlement if a predetermined time period has passed since a last performed on-line settlement.

Modification of the First Exemplary Embodiment

The settlement system 4 according to the present exemplary embodiment can be applied not only to payment with electronic money based on the balance of a bank account, but also to another kind of settlement, for example, payment with a credit card based on the credit balance. Further, the settlement system 4 can be used regardless of a cause of payment. A cause of payment may be payment of an equivalent money amount for commercial goods or a service, and may also be money loaning, debt repayment or simple money transfer.

The IC card 3 may be replaced by another recording medium, for example, a USB (Universal Serial Bus) memory. In that case, the reader/writer 16 is replaced by a USB interface. The IC card 3 may also be replaced, not by a thing carried by a person, but by a recording medium which is installed on the exterior of a car or on a wheelchair and is used, for example, for payment at a drive-through store.

The settlement system 4 may use, as a payment amount and the balance 52, values other than themselves but still enabling specifying them, for example, values obtained by changing their signs to be negative. In that case, the calculations described in the first exemplary embodiment are appropriately modified. For example, the magnitude relationship in comparison is reversed.

The settlement system 4 may update a limit amount stored in the IC card 3 each time of the on-line settlement, without comparing a limit amount at that time with an update threshold value.

The settlement system 4 may store the payment amount average 53, in a manner to correlate it with an ID, into a disk of another device or the like, instead of storing it into the account storage unit 22 of the server device 2. In that case, the account storage unit 22 does not necessarily need to store the payment amount average 53.

The settlement system 4 may acquire a value equivalent to the payment amount average 53 from another system. For example, the settlement system 4 may acquire such an equivalent value from a payment details creation system of a bank and the like. In that case, the first settlement unit 12 does not necessarily need to acquire a history of payment amounts. The terminal device 1 dries not necessarily need to comprise the history storage unit 14. The server device 2 does not necessarily need to comprise the average calculation unit 24. The account storage unit 22 does not necessarily need to store the payment amount average 53.

The settlement system 4 may set a maximum limit amount at a fixed value. This value is given to the server processing unit 21 and the money reception unit 23 by, for example, an administrator or the like of the server device 2. In that case, the first settlement unit 12 does not necessarily need to acquire a history of payment amounts. The terminal device 1 does not necessarily need to comprise the history storage unit 14. The server device 2 does not necessarily need to comprise the average calculation unit 24. The account storage unit 22 does not necessarily need to store the payment amount average 53.

The settlement system 4 does not necessarily need to comprise the ATM 42, and the server device 2 does not necessarily need to comprise the money reception unit 23. In that case, a process relevant to depositing money may be performed in a different system.

The settlement system 4 does not necessarily need to restrict a time period during which the off-line settlement is permitted to be performed continually. In that case, the IC card 3 does not necessarily need to comprise the date and time storage unit 33.

The settlement system 4 may have only a single user. In that case, the IC card 3 does not necessarily need to comprise the ID storage section 31, and the account storage unit 22 does not necessarily need to store the account ID 51.

The server device 2 does not necessarily need to comprise the account storage unit 22. The account storage unit 22 may be comprised in another device connected with the server device 2.

The account storage unit 22 may include a limit amount with regard to the account ID 51. Then, the server processing unit 21 may subtract a payment amount from the balance 52 (S42 in FIG. 6) and also from the limit amount stored in the account storage unit 22. In that case, the situation becomes such that the server device 2 stores a copy of a limit amount stored in the IC card 3, and accordingly the second settlement unit of the terminal device 1 does not necessarily need to send the limit amount to the server device 2 in the on-line settlement (S31 in FIG. 5).

The terminal device 1 may comprise the cash reading unit 44 and thereby perform a function relevant to depositing money into an account, replacing the ATM 42, in collaboration with the money reception unit 23.

Second Exemplary Embodiment

Figure 8:
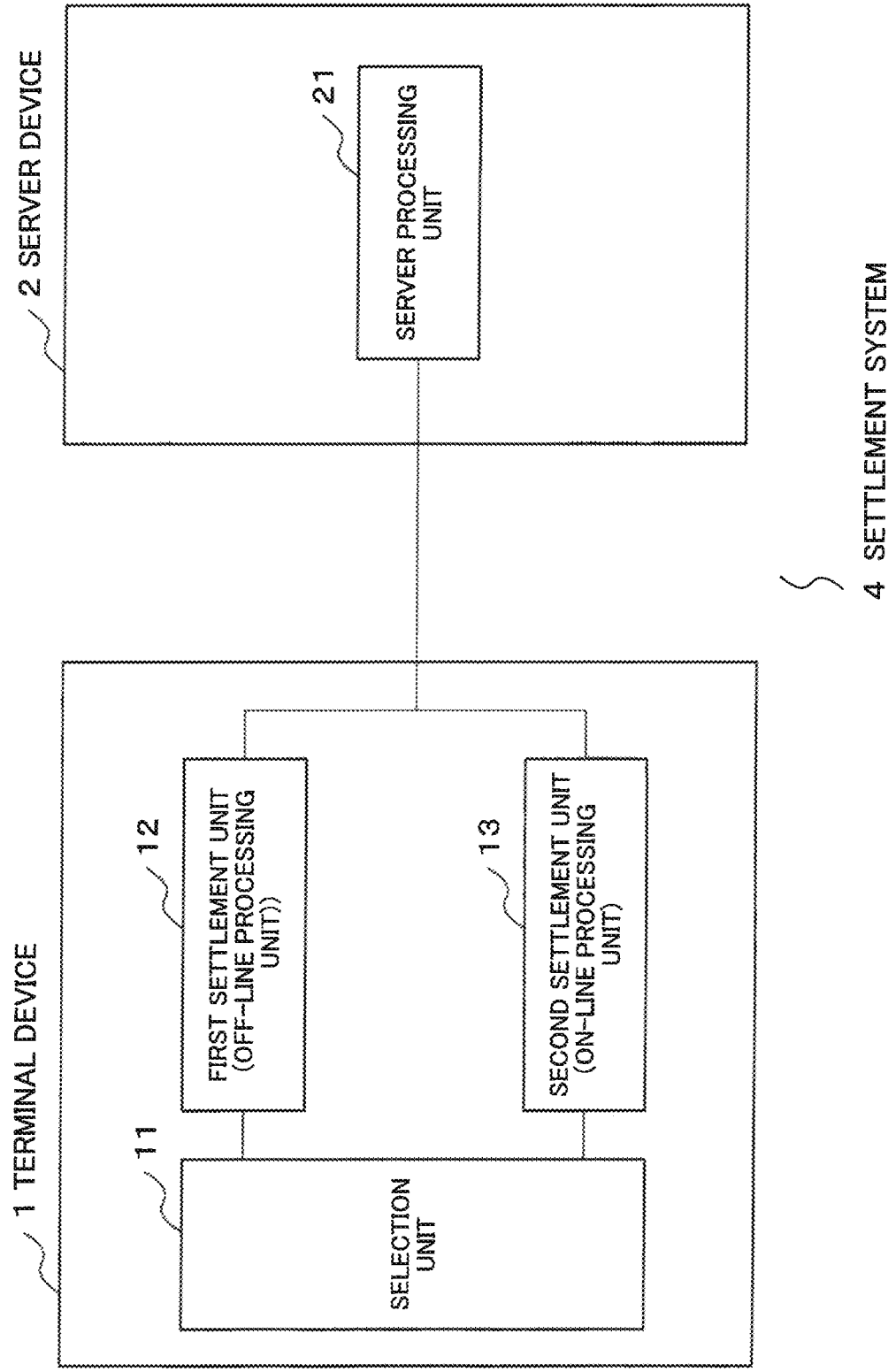
FIG. 8 is a configuration diagram of a settlement system 4 according to a second exemplary embodiment.
Figure 9:
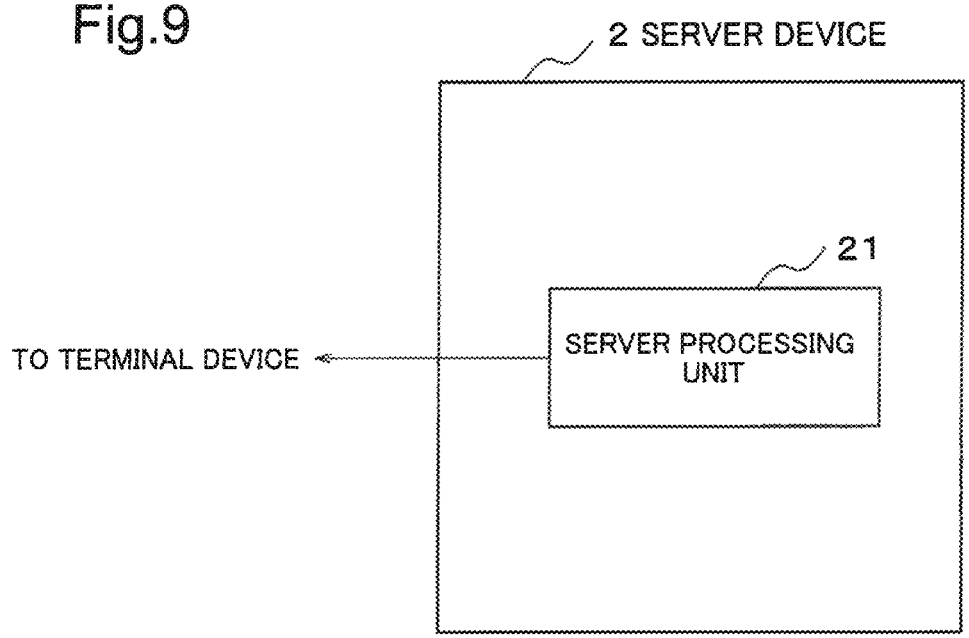
FIG. 9 is a configuration diagram of a server device 2 according to a third exemplary embodiment.

FIG. 8 is a configuration diagram of a settlement system 4 according to a second exemplary embodiment. The settlement system 4 includes a terminal device 1 and a server device 2.

The terminal device 1 is equipped: a selection unit 11 which compares a payment amount with a set amount read from a recording medium, for example, an IC card 3 and, depending on a result of the comparison, selects between off-line processing and on-line processing; an off-line processing unit 12 which performs a process of subtracting the payment amount from the set amount recorded in the recording medium and a process of sending the payment amount to the server device 2; and an on-line processing unit 13 which performs a process of sending the payment amount to the server device 2, and when having received an update value, performs a process of updating the set amount.

The server device 2 is equipped a server processing unit 21 which performs a process of receiving the payment amount from the terminal device 1 and a process of subtracting the payment amount from the balance of an account corresponding to the recording medium, and in a case of the on-line processing, performs a process of sending the update value to the terminal device 1.

The settlement system 4 according to the present exemplary embodiment can perform on-line settlement and off-line settlement by switching between them, while reducing risk to the business side and not causing a user making payment to be aware of the switching.

Specifically, the settlement system 4 can set a reference of the switching between on-line settlement and off-line settlement without acquiring a user's admission, for the purpose of speeding up the process, for example. Further, the settlement system 4 can set a different reference of the settlement switching for each user without acquiring the user's admission, for the purpose of reducing the user's risk of falling into settlement impossibility, for example.

It is because, in performing the on-line settlement, a user can use the whole of the balance of his/her bank account regardless of a limit amount for the off-line settlement stored in a portable-type recording medium. Specifically, it is because the limit amount is not subtracted from the balance of the bank account.

Third Exemplary Embodiment

FIG. 5 is a configuration diagram of a server device 2 according to a third exemplary embodiment.

The server device 2 is connected to a terminal device which performs: off-line processing including a process of comparing a payment amount with a set amount read from a recording medium, for example, an IC card 3 and, depending on a result of the comparison, subtracting the payment amount from the set amount recorded in the recording medium, and a process of sending the payment amount to the server device 2; or on-line processing including a process of sending the payment amount to the server device 2 and a process of updating the set amount when having received an update value.

The server device 2 is equipped a server processing unit 21 which performs a process of receiving the payment amount from the terminal device and a process of subtracting the payment amount from the balance of an account corresponding to the recording medium, and in a case of the on-line processing, performs a process of sending the update value to the terminal device.

The server device 2 of the present exemplary embodiment exhibits the same effect for the same reason as that of the settlement system 4 of the second exemplary embodiment.

Fourth Exemplary Embodiment

Figure 10:
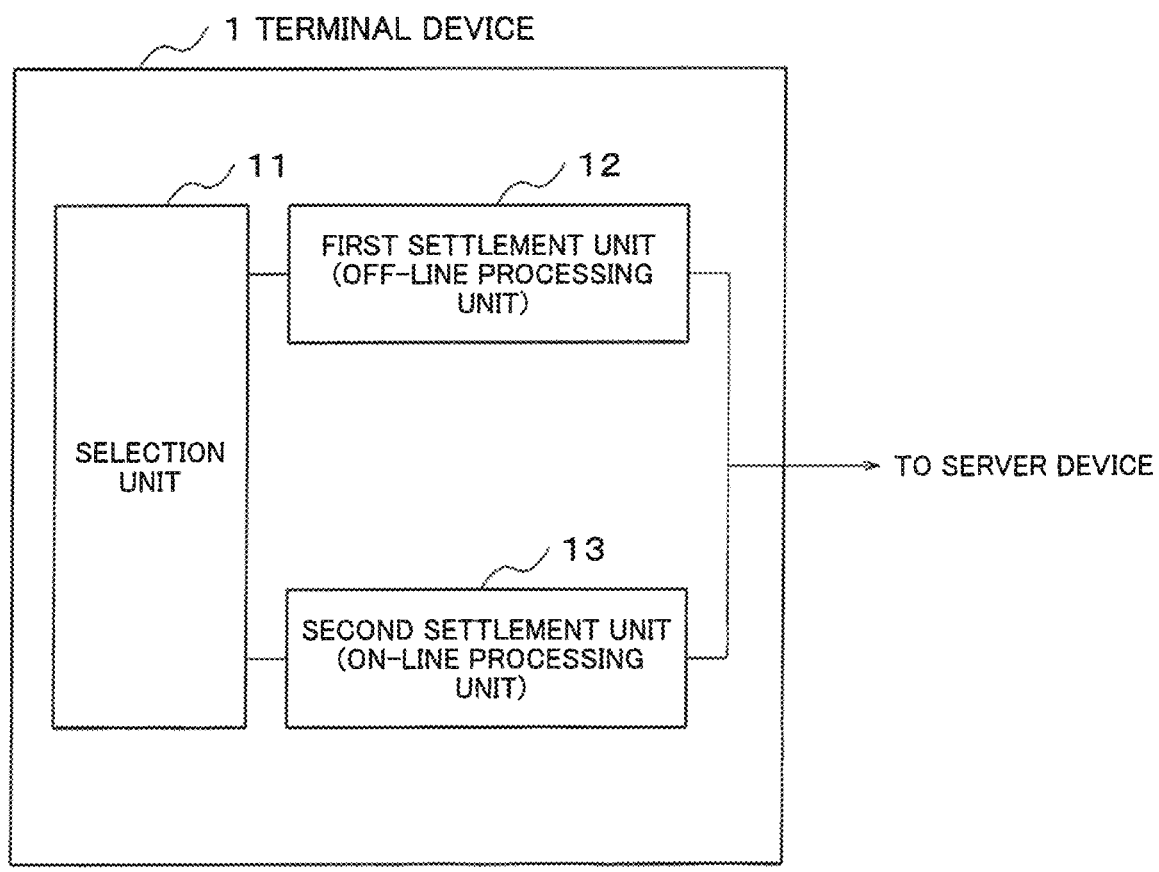
FIG. 10 is a configuration diagram of a terminal device 1 according to a fourth exemplary embodiment.

FIG. 10 is a configuration diagram of a terminal device 1 according to a fourth exemplary embodiment.

The terminal device 1 is equipped: a selection unit 11 which compares a payment amount with a set amount read from a recording medium, for example, an IC card 3 and, depending on a result of the comparison, selects between off-line processing and online processing; an off-line processing unit 12 which performs a process of subtracting the payment amount from the set amount recorded in the recording medium and a process of sending the payment amount to a server device; and an on-line processing unit 13 which performs a process of sending the payment amount to the server device and, when having received an update value, performs a process of updating the set amount.

This terminal device 1 is connected to the server device which performs a process of receiving the payment amount and a process of subtracting the payment amount from the balance of an account corresponding to the recording medium, and in a case of the on-line processing, performs a process of sending the update value.

The terminal device 1 of the present exemplary embodiment exhibits the same effect for the same reason as that of the settlement system 4 of the second exemplary embodiment.

The present invention has been described above with reference to the exemplary embodiments, but it is not limited to the above-described exemplary embodiments. To the configurations and details of the present invention, various changes and modifications which can be understood by those skilled in the art may be made within the scope of the present invention.

Part or the whole of the above-mentioned exemplary embodiments may also be described as the following supplementary notes, but are not limited to them.

(supplementary note 1) A settlement system comprising:
a terminal device including:
selection means for comparing a payment amount with a set amount read from a recording medium and for selecting between off-line processing and on-line processing, depending on a result of the comparison;
off-line processing means for performing a process of subtracting the payment amount from the set amount recorded in the recording medium and a process of sending the payment amount to a server device; and
on-line processing means for performing a process of sending the payment amount to the server device and a process of updating the set amount when having received an update value;
and
a server device comprising server processing means for performing a process of receiving the payment amount from the terminal device and a process of subtracting the payment amount from a balance of an account corresponding to the recording medium, and for performing, in a case of the on-line processing, a process of sending the update value to the terminal device.

(supplementary note 2) The settlement system according to supplementary note 1, wherein:
the on-line processing means does not update the set amount which the recording medium records if not receiving the update value, and the server processing means does not send the update value if the set amount is larger than an update threshold value.

(supplementary note 3) The settlement system according to any one of supplementary notes 1 and 2, wherein the server processing means sets a value of predetermined times an average of the payment amount subjected to the off-line processing as the update value, and the average as the update threshold value.

(supplementary note 4) The settlement system according to any one of supplementary notes 1 to 3, wherein the selection means further selects the on-line processing also if a predetermined time period has passed since the on-line processing was performed last.

(supplementary note 5) The settlement system according to any one of supplementary notes 1 to 4, wherein:

the settlement system further includes an ATM for reading a deposit amount put into a cash reading means, sending the deposit amount to the server device, and updating the set amount after receiving the update value, and the server device further is equipped a money reception means for receiving the deposit amount from the ATM and then adding the deposit amount to the balance, and for calculating the update value equal to or smaller than the balance after the addition and then for sending the calculated update value to the ATM.

(supplementary note 6) The settlement system according to any one of supplementary notes 1 to 4, wherein:

the terminal device comprises cash reading means, sends a deposit amount put into the cash reading means to the server device, and updates the set amount after receiving the update value, and the server device further comprises money reception means for receiving the deposit amount from the terminal device and then for adding the deposit amount to the balance, and for calculating the update value equal to or smaller than the balance after the addition and then for sending the calculated update value to the terminal device, (supplementary note 7) The settlement system according to any one of supplementary notes 1 to 6, wherein:

the recording medium further stores an identifier, the on-line processing means and the off-line processing means further send the identifier read from the recording medium to the server device, and the server processing means subtracts the payment amount from the balance of the account correlated to the identifier.

(supplementary note 8) A server device connected to a terminal device:

the terminal device performing:

a process of comparing a payment amount with a set amount read from a recording medium; and, depending on a result of the comparison, off-line processing including a process of subtracting the payment, amount from the set amount recorded in the recording medium and a process of sending the payment amount to the server device, or on-line processing comprising a process of sending the payment amount to the server device and a process of updating the set amount when having received an update value; and the server device comprising server processing means for performing a process of receiving the payment amount from the terminal device and a process of subtracting the payment amount from the balance of an account corresponding to the recording medium, and in a case of the on-line processing, performing a process of sending the update value to the terminal device.

(supplementary note 9) The server device according to supplementary note 8, wherein:

the terminal device does not update the set amount which the portable type recording media records, in a case of the on-line processing, if not receiving the update value, and the server processing means does not send the update value if the set amount is larger than the update threshold value.

(supplementary note 10) The server device according to any one of supplementary notes 8 and 9, wherein the server processing means sets a value of predetermined times an average of the payment amount subjected to the off-line processing as the update value, and the average as the update threshold value.

(supplementary note 11) A terminal device comprising:

selection means for comparing a payment amount with a set amount read from a recording medium and for selecting between off-line processing and on-line processing, depending on a result of the comparison;

off-line processing means for performing a process of subtracting the payment amount from the set amount recorded in the recording medium and a process of sending the payment amount to a server device; and on-line processing means for performing a process of sending the payment amount to the server device and a process of updating the set amount when having received an update value, wherein the terminal device connected to a server device which performs a process of receiving the payment amount and a process of subtracting the payment amount from a balance of an account corresponding to the recording medium, and in a case of the on-line processing, performs a process of sending the update value.

(supplementary note 12) The terminal device according to supplementary note 11, wherein:

the terminal device does not update the set amount which the portable type recording medium records, in a case of the on-line processing, if not receiving the update value, and the server processing means does not send the update value if the set amount is larger than the update threshold value.

(supplementary note 1) A method comprising:

performing a process of comparing a payment amount with a set amount read from a recording medium;

performing, depending on a result of the comparison, an off-line processing including a process of subtracting the payment amount from the set amount recorded in the recording medium and a process of sending the payment amount, or an on-line processing including a process of sending the payment amount and a process of updating the set amount when having received an update value; and performing a process of receiving the payment amount, a process of subtracting the payment amount from a balance of an account corresponding to the recording medium and, in a case of the on-line processing, a process of sending the update value.

(supplementary note 14) A method comprising:

connecting to a terminal device which performs:

a process of comparing a payment amount with a set amount read from a recording medium; and, depending on a result of the comparison, an off-line processing including a process of subtracting the payment amount from the set amount recorded in the recording medium and a process of sending the payment amount to a server device, or an on-line processing including a process of sending the payment amount to the server device and a process of updating the set amount when having received an update value; and performing a process of receiving the payment amount from the terminal device, a process of subtracting the payment amount from the balance of an account corresponding to the recording medium and, in a case of the on-line processing, a process of sending the update value to the terminal device, (supplementary note 15) The method according to supplementary note 14, wherein:

the connection is made to the terminal device which does not update the set amount recorded in the portable-type recording medium, in a case of the on-line processing, if not receiving the update value, and the process of sending the update value is not performed if the set amount is larger than an update threshold value.

(supplementary note 16) The method according to any one of supplementary notes 14 and 15, wherein a value of predetermined times an average of the payment amount subjected to the off-line processing is set as the update value, and the average is set as the update threshold value.

(supplementary note 17) A method comprising:

connecting to a server device which performs a process of receiving a payment amount, a process of subtracting the payment amount from a balance of an account corresponding to a recording medium and, in a case of the on-line processing, a process of sending an update value; performing a process of comparing the payment amount with a set amount read from the recording medium; and performing, depending on a result of the comparison, off-line processing including a process of subtracting the payment amount from the set amount recorded in the recording medium and a process of sending the payment amount to a server device, or on-line processing including a process of sending the payment amount to the server device and a process of updating the set amount when having received an update value.

(supplementary note 18) The method according to supplementary note 18, wherein:

the connection is made to a server device which does not send the update value if the set amount is larger than an update threshold value, and the process of sending the set amount recorded in the recording medium is not performed if not receiving the update value.

(supplementary note 19) A program for causing a computer connected to a terminal device, the terminal device performing:

a process of comparing a payment amount with a set amount read from a recording medium; and, depending on a result of the comparison, an off-line processing including a process of subtracting the payment amount from the set amount recorded in the recording medium and a process of sending the payment amount to a server device or an on-line processing including a process of sending the payment amount to the server device and a process of updating the set amount when having received an update value, to perform a process of receiving the payment amount from the terminal device, a process of subtracting the payment amount from the balance of an account corresponding to the recording medium and, in a case of the on-line processing, a process of sending the update value to the terminal device.

(supplementary note 20) The program according to supplementary note 19, wherein:

the terminal device does not update the set amount recorded in the portable-type recording medium, in a case of the on-line processing, if not receiving the update value, and the computer is not caused to perform the process of sending the update value if the set amount is larger than an update threshold value.

(supplementary note 21) The program according to any one of supplementary notes 19 and 20, wherein the computer is caused to set a value of predetermined times an average of the payment amount subjected to the off-line processing as the update value, and the average as the update threshold value.

(supplementary note 22) A program for causing a computer connected to a server device, the server device performing:

a process of receiving a payment amount, a process of subtracting the payment amount from a balance of an account corresponding to a recording medium and, in a case of on-line processing, a process of sending an update value, to perform:

a selection process of comparing the payment amount with a set amount read from the recording medium and, depending on a result of the comparison, selecting between off-line processing and the on-line processing;

the off-line processing including a process of subtracting the payment amount from the set amount recorded in the recording medium and a process of sending the payment amount to the server device; and the on-line processing including a process of sending the payment amount to the server device and a process of updating the set amount when having received the update value.

(supplementary note 23) The program according to supplementary note 22, wherein a computer connected to the server device, the server device not performing the process of sending the update value if the set amount is larger than an update threshold value, is not caused to perform the process of updating the set amount recorded in the recording medium if not receiving the update value.

REFERENCE SIGNS LIST 1 terminal device
2 server device
3 IC card
4 settlement system
11 selection unit
12 first settlement unit, off-line processing unit
13 second settlement unit, on-line processing unit
14 history storage unit
15 keyboard
16, 43 reader/writer
21 server processing unit
22 account storage unit
23 money reception unit
24 average calculation unit
31 ID storage unit
32 limit amount storage unit
33 date and time storage unit
41 network 42 ATM
44 cash reading unit
51 account ID
52 balance
53 payment amount average

The invention claimed is:

1. A terminal device configured to communicate with a sever device, the terminal device comprising:
at least one memory storing program instructions; and
at least one processor configured to execute the program instructions to:
determine whether a payment amount is greater than a limit amount stored in a recording medium;
perform an off-line process in a case where the payment amount is equal to or less than the limit amount; and
perform an on-line process in a case where the payment amount is greater than the limit amount,
wherein the off-line process includes:
subtracting the payment amount from the limit amount stored in the recording medium, and
wherein the on-line process includes:
sending the payment amount and the limit amount to the server device;
receiving an updated limit amount from the server device, the updated limit amount being less than the limit amount; and
setting the limit amount to the updated limit amount.

2. The terminal device according to claim 1, wherein the updated limit amount is a balance being stored in the server device.

3. The terminal device according to claim 2, wherein the processor is further configured to execute the program instructions to:
assign the balance as the updated limit amount; and
set the limit amount to be the balance as the limit amount of a next payment.

4. The terminal device according to claim 1, wherein the terminal device is a point of sales.

5. A method performed by a terminal device in communication with a sever device, the method comprising:
determining whether a payment amount is greater than a limit amount stored in a recording medium;
performing an off-line process in a case where the payment amount is equal to or less than the limit amount; and
performing an on-line process in a case where the payment amount is greater than the limit amount,
wherein the off-line process includes:
subtracting the payment amount from the limit amount stored in the recording medium, and
wherein the on-line process includes:
sending the payment amount and the limit amount to the server device;
receiving an updated limit amount from the server device, the updated limit amount being less than the limit amount; and
setting the limit amount to the updated limit amount.

6. The method according to claim 5, wherein the updated limit amount is a balance being stored in the server device.

7. The method according to claim 6, further comprising:
assigning the balance as the updated limit amount; and
setting the limit amount to be the balance as the limit amount of a next payment.

8. The method according to claim 5, wherein the terminal device is a point of sales.

* * * * *